(12) United States Patent
Carceller et al.

(10) Patent No.: US 9,034,977 B2
(45) Date of Patent: May 19, 2015

(54) POLYMER PRODUCT AND THE USE OF THE SAME AS DISPERSING AGENT

(75) Inventors: Rosa Carceller, Espoo (FI); Ari Juppo, Hakojärvi (FI); Reijo Aksela, Espoo (FI)

(73) Assignee: Kemira Oyj

( * ) Notice: Subject to any disclaimer, the term of this patent is extended or adjusted under 35 U.S.C. 154(b) by 0 days.

(21) Appl. No.: 14/123,564

(22) PCT Filed: Jun. 15, 2012

(86) PCT No.: PCT/FI2012/050622
§ 371 (c)(1),
(2), (4) Date: Feb. 25, 2014

(87) PCT Pub. No.: WO2012/175799
PCT Pub. Date: Dec. 27, 2012

(65) Prior Publication Data
US 2014/0194564 A1   Jul. 10, 2014

(30) Foreign Application Priority Data
Jun. 23, 2011   (FI) ..................................... 20115664

(51) Int. Cl.
| | | |
|---|---|---|
| C08F 220/52 | (2006.01) | |
| C08F 222/06 | (2006.01) | |
| C08F 218/08 | (2006.01) | |
| C08K 3/20 | (2006.01) | |
| C08F 8/12 | (2006.01) | |
| C08K 3/22 | (2006.01) | |
| C08K 3/26 | (2006.01) | |

(52) U.S. Cl.
CPC ... C08K 3/20 (2013.01); C08F 8/12 (2013.01); C08K 3/22 (2013.01); C08K 3/26 (2013.01)

(58) Field of Classification Search
CPC ....... C08L 31/04; C08L 33/064; C08L 33/24; C08L 29/02; C08L 30/02; C08F 218/08; C08F 220/52; C08F 222/06
USPC ......... 524/328.2, 425, 436; 526/330.3, 327.4, 526/555, 556, 563, 564
See application file for complete search history.

(56) References Cited

U.S. PATENT DOCUMENTS

| | | | | |
|---|---|---|---|---|
| 3,715,307 A | * | 2/1973 | Johnson et al. ................ | 210/701 |
| 3,715,336 A | * | 2/1973 | Nowak et al. .................... | 525/60 |
| 4,126,549 A | * | 11/1978 | Jones et al. .................... | 210/701 |
| 4,444,667 A | | 4/1984 | Burkert et al. | |
| 4,643,800 A | | 2/1987 | Maloney et al. | |
| 4,774,285 A | * | 9/1988 | Pfohl et al. ....................... | 525/60 |
| 4,880,497 A | * | 11/1989 | Pfohl et al. ...................... | 162/135 |
| 5,185,083 A | * | 2/1993 | Smigo et al. ................... | 210/735 |
| 5,229,029 A | * | 7/1993 | Colombo ....................... | 252/180 |
| 5,281,307 A | * | 1/1994 | Smigo et al. ................ | 162/164.3 |
| 5,326,809 A | * | 7/1994 | Bott et al. ....................... | 524/459 |
| 5,591,799 A | * | 1/1997 | Bott et al. ....................... | 524/555 |
| 5,629,184 A | * | 5/1997 | Goldenberg et al. .......... | 435/458 |
| 5,730,760 A | * | 3/1998 | Kirk et al. .......................... | 8/137 |
| 5,843,192 A | * | 12/1998 | Kirk et al. .......................... | 8/137 |
| 6,107,397 A | * | 8/2000 | Blankenburg et al. ......... | 524/813 |
| 6,264,839 B1 | | 7/2001 | Mohr et al. | |
| 6,426,383 B1 | * | 7/2002 | Fong et al. ..................... | 524/827 |
| 6,652,597 B1 | * | 11/2003 | Negele et al. ............... | 8/94.19 R |
| 2003/0092850 A1 | * | 5/2003 | Mori et al. .................. | 525/330.3 |
| 2009/0110907 A1 | * | 4/2009 | Jiang et al. .................. | 428/315.9 |

FOREIGN PATENT DOCUMENTS

| | | | | | |
|---|---|---|---|---|---|
| CA | 980209 | * | 12/1975 | ..................... | 134/3.3 |
| CA | 980209 A1 | | 12/1975 | | |
| GB | 1 593 582 | * | 7/1981 | ............... | C09C 3/10 |
| GB | 1593582 A | | 7/1981 | | |
| WO | 9525146 A1 | | 9/1995 | | |

OTHER PUBLICATIONS

Chang et al. Macromolecules 1993, 26, 4814-47817.*
International Search Report and Written Opinion dated Aug. 16, 2012.
Finnish Search Report dated Mar. 28, 2012.

* cited by examiner

*Primary Examiner* — Rip A Lee
(74) *Attorney, Agent, or Firm* — Thomas Horstemeyer, LLP

(57) ABSTRACT

The invention relates to a polymer product obtained by polymerization of
i) at least one monomer selected from N-vinylformamide and vinyl acetate, and
ii) maleic anhydride
to give a copolymer comprising N-vinylformamide and/or vinyl acetate and maleic anhydride followed by hydrolyzing formamide groups originating from N-vinylformamide to amino groups and/or acetate groups originating from vinyl acetate to hydroxyl groups and acid anhydride to dicarboxylic acid groups to give a water-soluble copolymer comprising amine and/or hydroxyl and carboxyl groups, wherein the molar ratio of the N-vinylformamide and/or vinyl acetate monomer to the maleic anhydride monomer is from 70:30 to 30:70. The polymer product can be used as a dispersing agent or as a scale inhibiting agent.

24 Claims, No Drawings

POLYMER PRODUCT AND THE USE OF THE SAME AS DISPERSING AGENT

CROSS REFERENCE TO RELATED APPLICATION

This application is the 35 U.S.C. §371 national stage of PCT application entitled "Polymer Product and the Use of the Same as Dispersing Agent," having serial number PCT/FI2012/050622, filed on 15 Jun. 2012, which claims priority to Finland Application No. 20115664, filing date Jun. 23, 2011, each incorporated by reference in their entireties.

TECHNICAL FIELD

The present invention relates to a polymer product for use as a dispersing agent for e.g. fillers or pigments, or as a scale inhibiting agent, and to a method for preparing a stable dispersion.

BACKGROUND OF THE INVENTION

Pigment particles and other dispersed solid particles usually have the tendency to flocculate and/or to precipitate. A dispersing agent prevents this flocculation and as a result stabilizes the dispersion. In addition, a dispersing agent lowers the viscosity of the dispersion. As a result the dispersion can be pumped or processed more easily at higher concentrations of solid particles.

In papermaking processes mineral fillers or pigments are usually introduced in the form of a dispersed filler/pigment. Useful dispersing agents are following: lignosulphonates such as Na lignosulphonate, condensation products of aromatic sulphonic acids with formaldehyde such as the condensed naphthalene sulphonates, dispersing anionic polymers, and copolymers made from anionic monomers or made anionic after polymerization, polymers containing repeating units having anionic charge such as carboxylic and sulphonic acids, their salts and combinations thereof. Also phosphates, non-ionic and cationic polymers, polysaccharides and surfactants may be used.

Inorganic dispersing agents have the disadvantage that they are not stable to hydrolysis, and some of the organic dispersing agents have the disadvantage of not being very effective. There is a continuing need to develop more efficient dispersing agents.

WO 95/25146 discloses the use of an anionic polyelectrolyte as a dispersing agent for inorganic material, such as kaolin clay or calcium carbonate. The anionic polyelectrolyte dispersing agent may be a water soluble salt of poly(acrylic acid) or of poly(methacrylic acid) having a weight average molecular weight of less than 20000.

GB 1 593 582 discloses a viscosity-stable aqueous dispersion suitable for use as a paper coating composition, including a filler or pigment, and 0.05 to 5.0% by weight, based on the weight of the filler or pigment, of a dispersing agent which comprises a maleic anhydride copolymer, such as a copolymer of propylene and maleic anhydride or a copolymer of propylene and maleic acid-half amide.

Chang et al. reports in Macromolecules, Vol. 26, No. 18, 1993, pages 4814-4817, the synthesis and characterization of a copolymer of maleic anhydride and N-vinyl formamide. MA and NVF were copolymerized by free-radical polymerization in tetrahydrofuran or ethyl acetate.

U.S. Pat. No. 4,444,667 discloses a flocculant for sludges comprising a polymer prepared by homopolymerizing N-vinylformamide in the presence of a free-radical initiator to give a poly-N-vinylformamide, followed by hydrolysis of from 10 to 90% of the formyl groups in the poly-N-vinylformamide. Flocculants have the reversed effect as compared to dispersing agents which are typically deflocculants.

U.S. Pat. No. 4,126,549 discloses a process for the prevention of scale and the inhibition of corrosion which comprises adding to water a hydrolyzed terpolymer of maleic anhydride with vinyl acetate and ethyl acrylate. The molecular weight of the terpolymer is below 1000 U.S. Pat. No. 4,126,549 also discloses some hydrolyzed copolymers of maleic anhydride with e.g. vinyl acetate, acrylonitrile or ethyl acrylate. These terpolymers and copolymers are produced by polymerization in a solvent using free radical initiator at temperatures of 110°-113° C. In the copolymers, the molar ratio of maleic anhydride to the comonomer is at least 3:1.

SUMMARY OF THE INVENTION

According to the present invention it was surprisingly found that certain hydrolyzed copolymers of N-vinylformamide and/or vinyl acetate with maleic anhydride worked excellent as dispersing agents for fillers and pigments and as scale inhibiting agents, especially when the molar ratio of the N-vinylformamide to the maleic anhydride or the molar ratio of the vinyl acetate to the maleic anhydride is within a certain range, preferable 1:1 or near 1:1.

The present invention provides a polymer product obtained by polymerization of at least one selected from N-vinylformamide and vinyl acetate, and maleic anhydride to give a copolymer of N-vinylformamide and/or vinyl acetate and maleic anhydride followed by hydrolyzing off formyl groups of N-vinylformamide to give amino groups or acetyl groups of vinyl acetate to give hydroxyl groups and hydrolysis of acid anhydride to dicarboxylic acid groups to give a water-soluble copolymer comprising vinyl amine or vinyl alcohol and maleate units. The formyl groups of N-vinylformamide or acetyl groups of vinyl acetate may be hydrolyzed off partially or completely.

One advantage of said copolymers is that when using maleic anhydride and the other comonomer in essentially equimolar amounts, the copolymers will be alternated as A-B-A-B-A-B, i.e. they are not random. Because maleic anhydride in not water-soluble, the copolymers may be made in waterless conditions, and after just adjusting the pH they are dissolved in water. The temperature of the synthesis affects the formation of alternate structure. When high temperatures, such as over 90° C., are used the monomer structure is random, but when using lower temperatures the alternate order will be obtained (see Seymour et al., J. Macromol. Sci.-Chem., A13(2), pp. 173-181 (1979); Chitanu et al., Revue Roumaine de Chimie, 2006, 51(9), 923-929).

Further, the hydrolysis degree can be controlled giving more hydrophilic or more hydrophobic polymers. The molar mass can also be adjusted, for example from about 1500 to 50 000.

Said copolymers have potential as dispersants and scale inhibitors.

DETAILED DESCRIPTION OF THE INVENTION

Thus, in one aspect of the invention there is provided a polymer product obtained by polymerization of
 i) at least one monomer selected from N-vinylformamide and vinyl acetate, and
 ii) maleic anhydride
to give a copolymer comprising N-vinylformamide and/or vinyl acetate and maleic anhydride followed by hydrolyzing formamide groups originating from N-vinylformamide to amino groups and/or acetate groups originating from vinyl acetate to hydroxyl groups and acid anhydride to dicarboxylic acid groups to give a water-soluble copolymer comprising amine and/or hydroxyl and carboxyl groups, wherein the molar ratio of the N-vinylformamide and/or vinyl acetate monomer to the maleic anhydride monomer is from 70:30 to 30:70.

The resulting copolymer may be amphiphilic meaning that it has both hydrophobic and hydrophilic groups.

In a preferred embodiment of the invention there is provided a polymer product obtained by polymerization of vinyl acetate and maleic anhydride to give a copolymer of vinyl acetate and maleic anhydride followed by hydrolyzing acetate groups to hydroxyl groups and acid anhydride to dicarboxylic acid groups to give a water-soluble copolymer containing hydroxyl and carboxyl groups.

In another preferred embodiment of the invention there is provided a polymer product obtained by polymerization of N-vinylformamide and maleic anhydride to give a copolymer of N-vinylformamide and maleic anhydride followed by hydrolyzing formamide groups to amino groups and acid anhydride to dicarboxylic acid groups to give a water-soluble copolymer containing amine and carboxyl groups.

The polymerization may be carried out as a bulk (mass) polymerization or solution polymerization, suspension polymerization, dispersion polymerization or emulsion polymerization. The polymerization is usually carried out at a temperature from 30 to 100° C. under inert gas atmosphere.

As a solvent in the solution polymerization, alcohols, such as methanol, ethanol, and isopropyl alcohol are usually preferred. Also cyclic ethers, such as tetrahydrofuran or 1,4-dioxane, or ketones, such as acetone or methyl ethyl ketone may be used. Another group of useful solvents include aromatic hydrocarbons, for example benzene, toluene, xylenes, isopropylbenzene, diisopropylbenzene, ethylbenzene, 1,2,4-trimethylbenzene, butylbenzene or mixtures thereof. Other useful solvents include ethyl acetate. In one embodiment the solution polymerization is carried out at non-aqueous conditions.

In the emulsion polymerization a water-in-oil type of emulsion may be formed.

Polymerization reactions described herein are initiated by any means which results in generation of a suitable free-radical. In free radical polymerization technique the source of free radicals can be any suitable method of generating free radicals such as thermally induced method, redox initiating method, photochemical initiating method or high energy radiation such as electron beam, X- or gamma ray radiation. The preferred method of generating free radicals is thermally induced method.

In the free radical polymerization typical thermal initiators are azo compound, peroxides or peroxyesters. The polymerization initiators are not limited to any particular species but may be any of the conventional initiators, inclusive redox initiators, azo initiators and peroxides. Among them, the azo initiators are preferred and, as specific examples thereof, there may be mentioned, among others, azonitrile compounds such as 2,2'-azobis(2-methylpropionitrile) (AIBN), azobis-dimethylvalero-nitrile and azobisdimethylmethoxyvale-ronitrile; azoamidine compounds such as 2,2'-azobis(methylpropionamidine)dihydro-chloride (V-50), VA-041, VA-044 and VA-061 (V-50, VA-041, VA-044 and VA-061 are products of Wako Pure Chemical Industries, Ltd.); azoamide compounds such as VA-080, VA-086 and VA-088 (products of Wako Pure Chemical Industries, Ltd.); azoalkyl compounds such as azodi-tert-octane and azoditert-butane; cyanopropylazo-formamide, 4,4'-azobis(4-cyanovaleric acid), 4,4'-azobis(cyanopentanoic acid) dimethylazobismethyl propionate, azobis-hydroxymethylpropionitrile and the like. Preferred initiators are 2,2'-azobis-(methylpropionamidine)dihydro-chloride (V-50), and 4,4'-azobis(cyanopentanoic acid) or 4,4'-azobis(4-cyanovaleric acid).

These radical polymerization initiators may be used alone or as mixtures of two or more of these initiators.

The molar ratio of the radical polymerization initiator to the monomers is preferably from 0.0001 to 0.1, more preferably from 0.0005 to 0.05, still more preferably from 0.0005 to 0.01.

The polymerization may be carried out in the presence of a chain transfer agent which controls the molar mass of the polymer. Suitable chain transfer agents include mercaptans, such as mercapto carboxylic acids, e.g. 3-mercaptopropionic acid, and alkyl mercaptans, e.g. butyl mercaptan or dodecyl mercaptan.

The polymerization is preferably carried out as a solution polymerization in an organic solvent, such as the above mentioned, or as a bulk (mass) polymerization without any solvents. In the latter case the monomers are melted.

The polymerization is preferably carried out at a temperature of at most 100° C., more preferably at a temperature from 50 to 100° C., even more preferably from 60 to 95° C., and most preferably from 65 to 90° C.

The molar ratio of the N-vinylformamide or the vinyl acetate monomer to the maleic anhydride monomer is from 70:30 to 30:70, preferably from 60:40 to 40:60, more preferably from 55:45 to 45:55.

In one embodiment the molar ratio is substantially 1:1. In such case alternating monomer composition may be obtained. The alternating structure seems to have certain advantageous properties. Without binding to any theory this may be because of a specific 3D structure of the formed polymer.

Preferably at least 5%, more preferably at least 10%, even more preferably at least 20%, and still even more preferably at least 50% of the formyl groups and/or acetyl groups are hydrolyzed off. Even at least 70% of the formyl groups and/or acetyl groups may be hydrolyzed off. In one embodiment from 5 to 50%, preferably from 10 to 50% of the formyl groups and/or acetyl groups are hydrolyzed off. Generally all or essentially all acid anhydride groups are hydrolyzed.

The hydrolysis may be carried out in the presence of an acid or a base. Suitable acids are hydrochloric acid, hydrobromic acid, phosphoric acid and sulphuric acid. The pH during the acidic hydrolysis is preferably between 0 and 5. Also carboxylic acids, such as formic acid, acetic acid, propionic acid or sulphonic acid may be used. Suitable bases are sodium hydroxide, potassium hydroxide, ammonia, amines and calcium hydroxide. The pH during the alkaline hydrolysis is preferably between 9 and 14. As a result of the alkaline hydrolysis the copolymer is obtained as a sodium, potassium, ammonium, amine or calcium salt. The hydrolysis may be carried out at a temperature from 20 to 100° C., preferably from 70 to 90° C. The hydrolysis may be carried out in water or in an aqueous medium, such as a mixture of water and an alcohol, such as methanol, ethanol, isopropanol, n-propanol, n-butanol or isobutanol.

The average molecular weight of the hydrolyzed polymer is preferably at least 1500, more preferably between 1500 and 50000, even more preferably between 2000 and 50000.

The N-vinylformamide/maleic anhydride (VFA-MA) copolymer may be prepared in waterless conditions by the polymerization of N-vinylformamide and maleic anhydride. The copolymer is then treated with a base to hydrolyze the formamide functionality to an amino group. At the same time, the anhydride bond is hydrolyzed to dicarboxylic acid unit. Thus, a hydrolyzed vinyl amine-maleic acid polymer is formed. In the basic conditions, carboxylic acid salt is formed. The resulting polymer is water soluble and may be amphiphilic (having both hydrophilic and hydrophobic groups).

Correspondingly, the vinyl acetate/maleic anhydride (VAc-MA) copolymer may be prepared in waterless conditions by the polymerization of vinyl acetate and maleic anhydride. The copolymer is then treated with a base to hydrolyze the acetate functionality to a hydroxyl group. At the same time, the anhydride bond is hydrolyzed to dicarboxylic acid unit. Thus, a hydrolyzed vinyl alcohol-maleic acid polymer is formed. In the basic conditions, carboxylic acid salt is formed. The resulting polymer is water soluble and may be amphiphilic (having both hydrophilic and hydrophobic groups).

In a second aspect, the present invention relates to the use of the above described polymer product of the invention as a dispersing agent for solid particles, such as fillers or pigments.

In a third aspect, the present invention relates to the use of the above described polymer product of the invention as a scale inhibiting agent. Scale inhibiting agents or antiscalants generally refer to agents used for the prevention of the formation of calcium carbonate or other calcium compound deposits.

In a fourth aspect of the invention there is provided method for preparing a stable dispersion of solids in an aqueous medium comprising introducing the above described polymer product of the present invention an as a dispersing agent into the medium.

The dispersing agent is preferably introduced in an amount of from 0.01 to 5.0%, more preferably from 0.05 to 3.0%, based on the weight of the dispersed solids.

The solid particles to be dispersed may be fillers or pigments to be used e.g. in paper manufacturing or in paints. The solid particles include calcium carbonate, such as precipitated calcium carbonate, gypsum, titanium dioxide, talc, kaolin, bentonite and other types of clay, silicate and silica. The solids concentration may be between 1 and 90%, preferably at least 30%, and more preferably between 30 and 80% by weight based on the total weight of the dispersion.

The foregoing may be better understood by reference to the following examples, which are presented for purposes of illustration and are not intended to limit the scope of the invention.

Both of the tested versions, hydrolyzed polymers obtained by polymerization of maleic anhydride and N-vinylformamide or maleic anhydride and vinyl acetate, had good to excellent dispersant performance for ground calcium carbonate (GCC). The hydrolyzed polymers also showed good performance as scale inhibitor.

EXAMPLES

Example 1

Polymerization of N-vinylformamide and Maleic Anhydride 12.05 g maleic anhydride, 1.28 g 3-mercaptopropionic acid and 133.7 g of tetrahydrofurane THF were placed in a 250 ml flask equipped with a mechanical stirrer, a nitrogen inlet, and a condenser. The mixture was purged with $N_2$ for 30 min. and then it was heated to 65° C. 0.755 g initiator (azoisobutyronitrile, AIBN) was added to the flask and 13.06 g N-vinylformamide (was fed into the flask during 10 hours.

After the feeding was completed, the reaction was allowed to continue for an additional hour. The copolymer precipitated in the media. It was filtered and dried in the oven at 60° C. overnight.

18.1 g of beige dry product was obtained. This solid product was ready soluble in water.

By GPC (polyacrylic acid standards), molar mass of the copolymer was 5300 Daltons and polydispersity was 1.1. 2.20 g of the obtained polymer is placed in a flask and 10.56 g of 2N NaOH solution was added. The pH of the solution was 7.1. By NMR-spectroscopy the molar ratio of the monomers in the polymer was about 1:1 in mol %. At this pH about 21% of the N-vinylformamide groups were hydrolyzed to N-vinylamine groups.

Example 2

Polymerization of Vinyl Acetate and Maleic Anhydride 13.30 g maleic anhydride and 175.07 g toluene were added to a 250 ml four-neck flask fitted with nitrogen-controlled inlet valve, a condenser, a temperature controller and a mechanical stirrer. The flask was flushed with $N_2$ gas, and then the mixture was gradually heated. When the reaction mixture reaches 90° C., 1.3 g of benzoyl peroxide (BPO as 75% solution) was added to the flask and 5.85 g of vinyl acetate (VAc) were pumped to the reaction mixture during 1 h. The reaction continued for 8 h more at 90° C., with $N_2$ and stirring. The copolymer precipitated in the media. It was filtered and dried in the oven at 60° C. for 2-3 days.

15.5 g of dry white powder was obtained. This product was not soluble in water, it needed to be in neutral or basic pH to be soluble in water.

By GPC (polyacrylic acid standards), molar mass of the copolymer was 3400 Daltons and polydispersity was 1.4.

2.2 g of the obtained polymer was placed in a flask and 10.49 g of 2N NaOH solution was added. The pH of the solution was 7. By NMR-spectroscopy the molar ratio of the monomers in the polymer was about 1:1 in mol %. At this pH about 7% of vinyl acetate groups were hydrolyzed to vinyl alcohol groups.

Example 3

Polymerization of N-vinylformamide and Maleic Anhydride 28.21 g maleic anhydride and 350.6 g of tetrahydrofurane THF are placed in a 250 ml flask equipped with a mechanical stirrer, a nitrogen inlet, and a condenser. The mixture was purged with $N_2$ for 30 min. and then is heated to 65° C. 0.201 g initiator (V-501 from Wako; 4,4'-azobis(4-cyanovaleric acid) is added to the flask and 41.79 g N-vinylformamide is fed to the flask during 10 hours. After the feeding was completed, the reaction was allowed to continue for and additional hour. The copolymer precipitates in the media. It is filtered and dried in the oven at 60° C. overnight.

40.02 g of beige dry product is obtained.

By GPC, (polyacrylic acid standards) molar mass of the copolymer was 45 500 Daltons.

9.04 g of the obtained polymer is placed in a flask and 3.76 g of 50 wt % NaOH solution is added. The mixture was heated to 90° C. and kept in that temperature 8 h.

Example 4

Polymerization of Vinyl Acetate and Maleic Anhydride 42.1 g maleic anhydride and 555 g toluene were added to a 1000 ml four-neck flask fitted with nitrogen-controlled inlet valve, a condenser, a temperature controller and a mechanical stirrer. The flask was flushed with $N_2$ gas, and then the mixture was gradually heated. When the reaction mixture reaches 90° C., 3.17 g of benzoyl peroxide (BPO as 75% solution) was added to the flask and 37.1 g of vinyl acetate (VAc) were pumped to the reaction mixture during 1 h. The reaction continued for 8 h more at 90° C., with $N_2$ and stirring. The copolymer precipitated in the media. It was filtered and dried in the oven at 60° C. for 2-3 days.

64.3 g of dry white solid was obtained. This product was not soluble in water, it needed to be in neutral or basic pH to be soluble in water.

By GPC (polyacrylic acid standards), molar mass of the copolymer was 7450 Daltons and polydispersity was 1.2.

0.4 g of the obtained polymer was placed in a flask and 2.7 g of water and 0.73 g of 50 wt % NaOH solution were added and the mixture was stirred until solution was formed. The pH of the solution was 9. At this pH about 100% of vinyl acetate groups were hydrolyzed to vinyl alcohol groups.

Example 5

A number of commercial dispersing agents and the dispersing agent containing hydrolyzed polymers obtained by polymerization of maleic anhydride and n-vinylformamide of the present invention prepared in the above Example 3 were tested as dispersing agents for anatase (titanium dioxide) slurries. The results of the tests are shown in Table 1.

Dry $TiO_2$-powder (Hombitan Anatase LV) was metered into the vessel containing dispersant and water and mixed for 15 min at 3000 rpm in Diaf-mixer. The tested dispersing agents were Coatex PE 851, Coatex TH33-40S, Fennodispo C33, Fennodispo A 41, Bevaloid 211, Bevaloid 6770, NVF-MA of Example 3, and Colloid-2640. All the dispersants had a dose of 0.66 parts per hundred part of the dry pigment (pph) and the NVF-MA of Example 3 was also tested with the dose of 0.43 pph.

For Coatex TH33-40S, Fennodispo C33, Fennodispo A 41, Bevaloid 211, Bevaloid 6770 and Colloid-2640 no dispersion was formed. For NVF-MA of Example 3 with the dose on 0.66 the viscosity was too high to measure. Probably the reason for that was that the molecular weight of the polymer was relatively high, about 45 500 daltons, and thus a smaller dose than 0.66 pph should be used.

TABLE 1

| Hombitan ANATASE LV | | Coatex PE 851 (0.66 pph) | NVF-MA of Example 3 (0.43 pph) |
|---|---|---|---|
| $TiO_2$ | | 100 | 100 |
| Brookfield 100 rpm | mPas | 618 | 588 |
| Brookfield 50 rpm | mPas | 1042 | 964 |
| Hercules FF at 4400 rpm | mPas | 185 | 85 |
| Density | kg/l | 2.1 | 2.1 |
| Solids content | % | 72.3 | 68.12 |
| pH | | 6.51 | 7.25 |
| C. ° | | 22.5 | 24.4 |

Colloid-220 was compared to hydrolyzed polymers obtained by polymerization of maleic anhydride and n-vinylformamide or maleic anhydride and vinyl acetate of the invention. Dry GCC-powder (HC-90) was metered into a vessel containing dispersant and water and mixed for 30 min at 20 Hz in Diaf-mixer. The results of the tests are shown in Table 2. A viscosity of less than 600 mPas is a good result.

TABLE 2

| | | 1 | 2 | 3 |
|---|---|---|---|---|
| HC-90, dry powder | | 100 | 100 | 100 |
| Colloid-220 | | 0.6 | — | — |
| NVF-MA of Example 1 | | — | 0.6 | — |
| VAc-MA of Example 2 | | — | — | 0.6 |
| C. ° | | 25 | 25 | 25 |
| Brookfield 100 rpm | mPas | 390 | 149 | 446 |
| Brookfield 50 rpm | mPas | 478 | 136 | 630 |
| Hercules FF at 4400 rpm | mPas | 715 | 142 | 1155 |
| Density | kg/l | 1.88 | 1.87 | 1.88 |
| Solids content | % | 76.4 | 76.6 | 76.4 |
| pH | | 10.0 | 9.0 | 8.7 |

Example 6

A commercial scale inhibitor and a scale inhibitor containing a hydrolyzed polymer obtained by polymerization of maleic anhydride and vinylacetate of the present invention prepared in the above Example 4 were tested as scale inhibitors. The results of the tests are shown in Table 3.

About 10-30 ml purified water (milliQ, Millipore) was placed in a 100 ml glass bottle. Scale inhibitor solution that has pH 8.5 and is diluted to 100 ppm of it was added to the bottle to get final scale inhibitor concentrations of 2, 5, 10 and 20 ppm in the end of the sample preparation. 10 ml of carbonate brine (13.44 g of $NaHCO_3$ in 1 litre milliQ water), 5 ml of buffer solution (10% solution of $NH_4Cl$ in milliQ water, adjusted to pH 9.0 with 25% $NH_4OH$ solution) and 10 ml calcium solution (23.52 g of $CaCl_2 \times 2H_2O$ in 1 litre milliQ water) is added. Then milliQ water is added to get 100 g and the bottle is capped and shaked. The bottles are kept in 50° C. 20 h. Blank is made without scale inhibitor and Ca-sample is made by mixing 10 ml calcium solution with water to get 100 g. Ca sample is kept in the room temperature. For example, when 2 ppm sample is made, 30 ml water is added in the beginning and inhibitor solution is added 4 ml.

Samples are let cool down about 1.5 h. About 1.5 ml supernatant is withdrawn and filtered through 0.45 um filter. 1.0 ml of sample and 2.5 ml of 37% HCl are added to a 50 ml volumetric flask and filled to the mark with milliQ water. Ca content is analyzed by Inductively Coupled Plasma Spectroscopy (ICP).

The efficiency of the scale inhibitor according to the invention was compared to a commercial scale inhibitor Belclene 200 (hydrolyzed polymaleic anhydride, Mw 400-800). The results of the inhibiting effect (%) can be seen in the Table 3.

TABLE 3

| Dosage (ppm) | Example 4 | Belclene 200 |
|---|---|---|
| 2 | 62.6 | 51.7 |
| 5 | 77.7 | 68.4 |
| 10 | 103.3 | 77.8 |
| 20 | 107.1 | 91.5 |

The invention claimed is:
1. A method for preparing a stable dispersion of solids comprising fillers or pigments in an aqueous medium comprising introducing a polymer product as a dispersing agent into the medium, said polymer product being obtained by polymerization of
N-vinylformamide, vinyl acetate, and
maleic anhydride to give a copolymer comprising N-vinylformamide, vinyl acetate and maleic anhydride followed by hydrolyzing formamide groups originating from N-vinylformamide to amino groups, acetate groups originating from vinyl acetate to hydroxyl groups and acid anhydride to dicarboxylic acid groups to give a water-soluble copolymer comprising amine, hydroxyl and carboxyl groups, wherein the molar ratio of the N-vinylformamide and vinyl acetate monomer to the maleic anhydride monomer is from 70:30 to 30:70.

2. The method according to claim 1 wherein at least 50% of the formamide groups and acetate groups are hydrolyzed.

3. The method according to claim 1 wherein at least 20% of the formamide groups and acetate groups are hydrolyzed.

4. The method according to claim 1 wherein at least 10% of the formamide groups and acetate groups are hydrolyzed.

5. The method according to claim 1 wherein at least 5% of the formamide groups and acetate groups are hydrolyzed.

6. The method according to claim 1 wherein the hydrolysis is carried out in the presence of an acid or a base.

7. The method according to claim 1 wherein the polymerization is carried out as a solution polymerization in an organic solvent.

8. The method according to claim 7 wherein the organic solvent is an alcohol, the alcohol consisting of one of a group of: methanol, ethanol or isopropyl alcohol, a cyclic ether, a ketone, ethyl acetate or an aromatic hydrocarbon.

9. The method of claim 8 wherein the ether consists of one of a group of:
tetrahydrofuran and 1,4-dioxane.

10. The method of claim 8 wherein the ketone consists of one of a group of:
acetone and methyl ethyl ketone.

11. The method of claim 8, wherein the ethyl acetate or an aromatic hydrocarbon consists of one of the group of: benzene, toluene, xylene, isopropylbenzene, diisopropylbenzene, ethyl benzene, 1,2,4-trimethylbenzene and butylbenzene.

12. The method according to claim 1 wherein the polymerization is carried out without any solvents.

13. The method according to claim 1 wherein the polymerization is carried out at a temperature from 65 to 90° C.

14. The method according to claim 1 wherein the polymerization is carried out at a temperature from 50 to 100° C.

15. The method of claim 1 wherein the polymerization is carried out at a temperature of at most 100° C.

16. The method according to claim 1 wherein the molar ratio of the N-vinylformamide and vinyl acetate monomer to the maleic anhydride monomer is about 1:1.

17. The method according to claim 1 wherein the molar ratio of the N-vinylformamide and vinyl acetate monomer to the maleic anhydride monomer is from 55:45 to 45:55.

18. The method according to claim 1 wherein the molar ratio of the N-vinylformamide and vinyl acetate monomer to the maleic anhydride monomer is from 60:40 to 40:60.

19. The method according to claim 1 wherein the average molecular weight of the hydrolyzed polymer is between 2000 Daltons and 50000 Daltons.

20. The method according to claim 1 wherein the average molecular weight of the hydrolyzed polymer is between 1500 Daltons and 50000 Daltons.

21. The method according to claim 1 wherein the average molecular weight of the hydrolyzed polymer is at least 1500 Daltons.

22. The method according to claim 1 wherein the solids comprise ground calcium carbonate.

23. The method according to claim 1 wherein the dispersing agent is introduced in an amount of from 0.05 to 3.0%, based on the weight of the dispersed solids.

24. The method according to claim 1 wherein the dispersing agent is introduced in an amount of from 0.01 to 5.0%, based on the weight of the dispersed solids.

* * * * *